United States Patent
Karino et al.

[11] Patent Number: 5,272,313
[45] Date of Patent: Dec. 21, 1993

[54] ARC WELDER

[75] Inventors: Kunio Karino, Suita; Haruo Moriguchi, Itami; Toshikazu Fujiyoshi, Kawanishi; Tetsurou Ikeda, Osaka; Kenzo Danjo, Kizu; Masahiro Aoyama, Higashi-osaka, all of Japan

[73] Assignee: Sansha Electric Manufacturing Co., Ltd., Osaka, Japan

[21] Appl. No.: 962,923

[22] Filed: Oct. 19, 1992

[30] Foreign Application Priority Data

Oct. 18, 1991 [JP] Japan .................. H3-299945

[51] Int. Cl.⁵ .............................. B23K 9/10
[52] U.S. Cl. ................. 219/130.21; 363/142
[58] Field of Search .......... 219/130.1, 130.21, 137 PS; 363/142, 143

[56] References Cited

FOREIGN PATENT DOCUMENTS 55-131272 10/1980 Japan .................. 363/143
56-80373 7/1981 Japan .
1-151975 10/1989 Japan .

Primary Examiner—Clifford C. Shaw
Attorney, Agent, or Firm—Wegner, Cantor, Mueller & Player

[57] ABSTRACT

An arc welder which can be used with either a high voltage a.c. power supply of a certain voltage or a low voltage a.c. power supply of about a half of said voltage, such as 400 or 200 volts, for example, and which is provided with a circuit configuration in which an input a.c. voltage is rectified by a rectifier and smoothed by a pair of capacitors and the resultant d.c. power is converted by an invertor into a high frequency a.c. power which is reduced in voltage by an output transformer and then rectified again, and arranged to discriminate the input a.c. voltage and switchingly connect these capacitors in series or parallel between both ends of the input rectifier, thereby automatically conforming the circuit to both high and low supply voltages.

4 Claims, 2 Drawing Sheets

ARC WELDER

BACKGROUND OF THE INVENTION

This invention relates to an arc welder and especially, to an improved arc welder which can be used when its input power supply voltage is not only a high voltage but also a low voltage which is about a half of the high voltage.

Such a power supply device for arc welder which can be operated with either of two kinds of input power supply voltage is disclosed, for example, in the Japanese opened patent gazette No. S56-80373. This device includes a power transformer having a center-tapped primary winding, a voltage detector for detecting the input voltage and a controlled switch responsive to a detection signal of the detector for switching between the center and end taps of the power transformer and is arranged to generate a nearly same voltage across the secondary winding of the transformer regardless of the input voltage and rectify this secondary voltage to obtain a low voltage d.c. output for welding. Although this device can automatically conform to two kinds of input power supply and also be applied not only to single-phase a.c. power but also to three-phase a.c. power, it can not be expected to make the device small in both size and weight since the power transformer is large in both size and weight.

An arc welder proposed in the Japanese opened patent gazette No H1-151975 for removing this problem comprises, instead of the power transformer, an input rectifier of diode bridge type for rectifying an a.c. input, a pair of smoothing capacitors for smoothing the rectified output, an invertor having a half-bridge configuration of switching transistors for converting the d.c output into a high frequency a.c. power, an output transformer for transforming the output of the invertor into a suitable voltage and a rectifier for rectifying the output of the transformer, and the input rectifier has two pairs of input terminals for high and low voltages, respectively, and is arranged to subject its a.c. input to full-wave rectification at the time of high voltage and to voltage doubling rectfication at the time of low voltage, thereby constantly keeping always the input of the invertor. This device can be made small in size and weight since the heavy power transformer has been substituted with a light output transformer. However, the power supply must be manually connected to either of the two pairs of input terminals in accordance with its voltage and, moreover, it cannot be applied to a three-phase a.c. power supply.

Accordingly, an object of this invention is to provide a small-sized and light-weighted arc welder which can automatically conform to two kinds of a.c. power supply voltage and use an a.c. power supply not only of single phase, but also of three phases.

SUMMARY OF THE INVENTION

While the arc welder according to this invention also comprises, as the above-mentioned invertor-type welder, an input rectifier for rectifying the input a.c. power, a pair of capacitors for smoothing the output of the rectifier, a pair of invertors for converting d.c. voltages across the respective capacitors into high frequency a.c. voltages, an output transformer for suitably reducing the output voltages of the invertors and an output rectifier for rectifying the output of the transformer, it further comprises, as a feature of this invention, means for discriminating the high and low voltage inputs to switchingly connect the pair of capacitors in series or parallel between the output terminals of the input rectifier. More particularly, both capacitors are connected in series in case of the high voltage power supply and in parallel in case of the low voltage power supply and, therefore, the voltage of each capacitor charged by the low voltage power supply is about twice the voltage charged by the high voltage power supply. Accordingly, when the high voltage of the power supply is twice the low voltage thereof, the input voltage of each invertor is fixed regardless of the power supply voltage and its value is nearly equal to the value of the low voltage.

According to the above-mentioned configuration, therefore, the applied voltage of each invertor is reduced even in the case of high voltage power supply and it is possible to reduce necessary breakdown voltage of the invertor components to raise their switching frequency. Since this makes it possible to raise the operation frequency of the invertor, it becomes possible to make the output transformer small in both size and weight and also to use a three-phase a.c. power supply.

These and other features and functions of this invention will be described in more detail below in connection with an embodiment thereof with reference to the accompanying drawings.

BRIEF DESCRIPTION OF THE DRAWINGS

In the Drawings.

Throughout the drawings, the same reference numerals are given to the same structural components.

DESCRIPTION OF PREFERRED EMBODIMENTS

Figure 1:
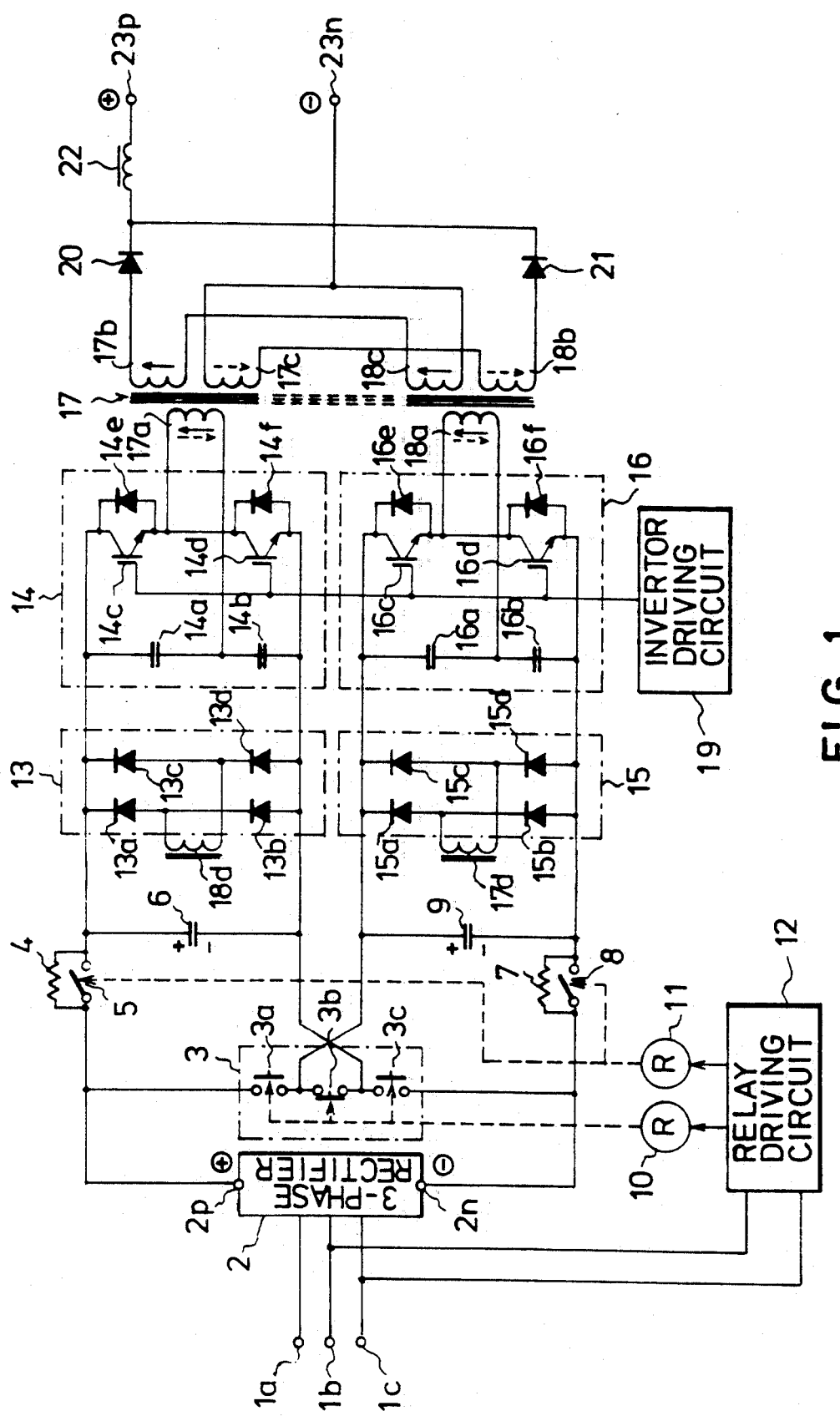
FIG. 1 is a diagram showing a circuit configuration of an embodiment of the arc welder according to this invention.

Referring to FIG. 1, three input terminals 1a, 1b and 1c, which are to be connected to a three-phase commercial power supply to be used, are connected to a three-phase rectifier 2 of a well-known type and a main switch unit 3 including a series connection of normally-open switch 3a, normally-closed switch 3b and normally-open switch 3c is inserted between positive and negative output terminals 2p and 2n of the rectifier 2. The positive terminal 2p of the rectifier 2 is connected through a parallel connection of current limiting resistor 4 and normally-open switch 5 to a positive electrode of a first smoothing capacitor 6 of large capacity and the negative terminal 2n thereof is connected through a parallel connection of current limiting resistor 7 and normally-open switch 8 to a negative electrode of a second smoothing capacitor 9 of large capacity. The three switches 3a, 3b and 3c of the main switch unit 3 are driven concurrently by a main relay 10 and the switches 5 and 8 are driven concurrently by a timer relay 11. The relays 10 and 11 are driven by a relay driving circuit 12 connected to the two input terminals 1b and 1c of the three-phase power supply, as described below.

The negative electrode of the first smoothing capacitor 6 is connected to a junction of the main switches 3b and 3c and the positive electrode of the second smoothing capacitor 9 is connected to a junction of the main switches 3a and 3b. A feedback rectifier 13 and an invertor 14 enclosed with phantom blocks are connected in parallel to the first smoothing capacitor 6 and a feedback rectifier 15 and an invertor 16 enclosed with phantom blocks are connected in parallel to the second smoothing capacitor 9.

As shown, the feedback rectifier 13 is composed of a diode bridge of diodes 13a, 13b, 13c and 13d and a tertiary winding 18d of an output transformer 18 is inserted between a junction of the diodes 13a and 13b and a junction of the diodes 13c and 13d. The feedback rectifier 15 is composed of a diode bridge of diodes 15a, 15b, 15c and 15d and a tertiary winding 17d of an output transformer 17 is inserted between a junction of the diodes 15a and 15b and a junction of the diodes 15c and 15d.

As shown, the invertors 14 and 16 are composed of half-bridge circuits of semiconductor switching elements, which are operated respectively with d.c. voltages across the smoothing capacitors 6 and 9. More specifically, the invertor 14 includes a series connection of small capacitors 14a and 14b and a series connection of insulated gate bipolar transistors (hereinunder referred to as "IGBTs") 14c and 14d as the semiconductor switching elements, which are connected in parallel across the smoothing capacitor 6, and high speed diodes 14e and 14f are respectively connected in inverse parallel between collectors and emitters of the IGBTs 14c and 14d. Similarly, the invertor 16 includes a series connection of small capacitors 16a and 16b and a series connection of IGBTs 16c and 16d as the semiconductor switching elements which are connected in parallel across the smoothing capacitor 9 and high speed diodes 16e and 16f are respectively connected in inverse parallel between collectors and emitters of the IGBTs 16c and 16d. The output transformer 17 has a primary winding 17a connected between a junction of the capacitors 14a and 14b and a junction of the IGBTs 14c and 14d and the output transformer 18 has a primary winding 18a connected between a junction of the capacitors 16a and 16b and a junction of the IGBTs 16c and 16d. The IGBTs 14c, 14d, 16c and 16d have their gates connected to an invertor driving circuit 19.

The output transformers 17 and 18 are respectively provided with first and second secondary windings 17b, 17c and 18b, 18c having the same number of turns and the first secondary windings 17b and 18b and the second secondary windings 17c and 18c are respectively connected in series in the same winding direction. The two series connections of the secondary windings are connected through respective two-phase, half-wave rectifying diodes 20 and 21 and a common smoothing reactor 22 between positive and negative output terminals 23p and 23n to constitute a current balancing full-wave rectifier for synthesizing and rectifying positive half-waves of high frequency a.c. power generated across the first secondary windings of both transformers and negative half-waves of high frequency a.c. power generated across the second secondary windings thereof. The aforementioned tertiary windings 17d and 18d of the output transformers 17 and 18, whose outputs are rectified by the feedback rectifiers 15 and 13 and applied to each other invertors, also forms a current balancer. The above-mentioned two output transformers can be made small in both size and weight by having their primary, secondary and tertiary windings wound on different legs of the same iron core to form a rough electromagnetic coupling therebetween. The turns ratio of the transformer is selected so that a d.c. voltage such as of 50 to 60 volts, which is suitable for arc welding, is produced between the output terminals 23p and 23n.

Figure 2:
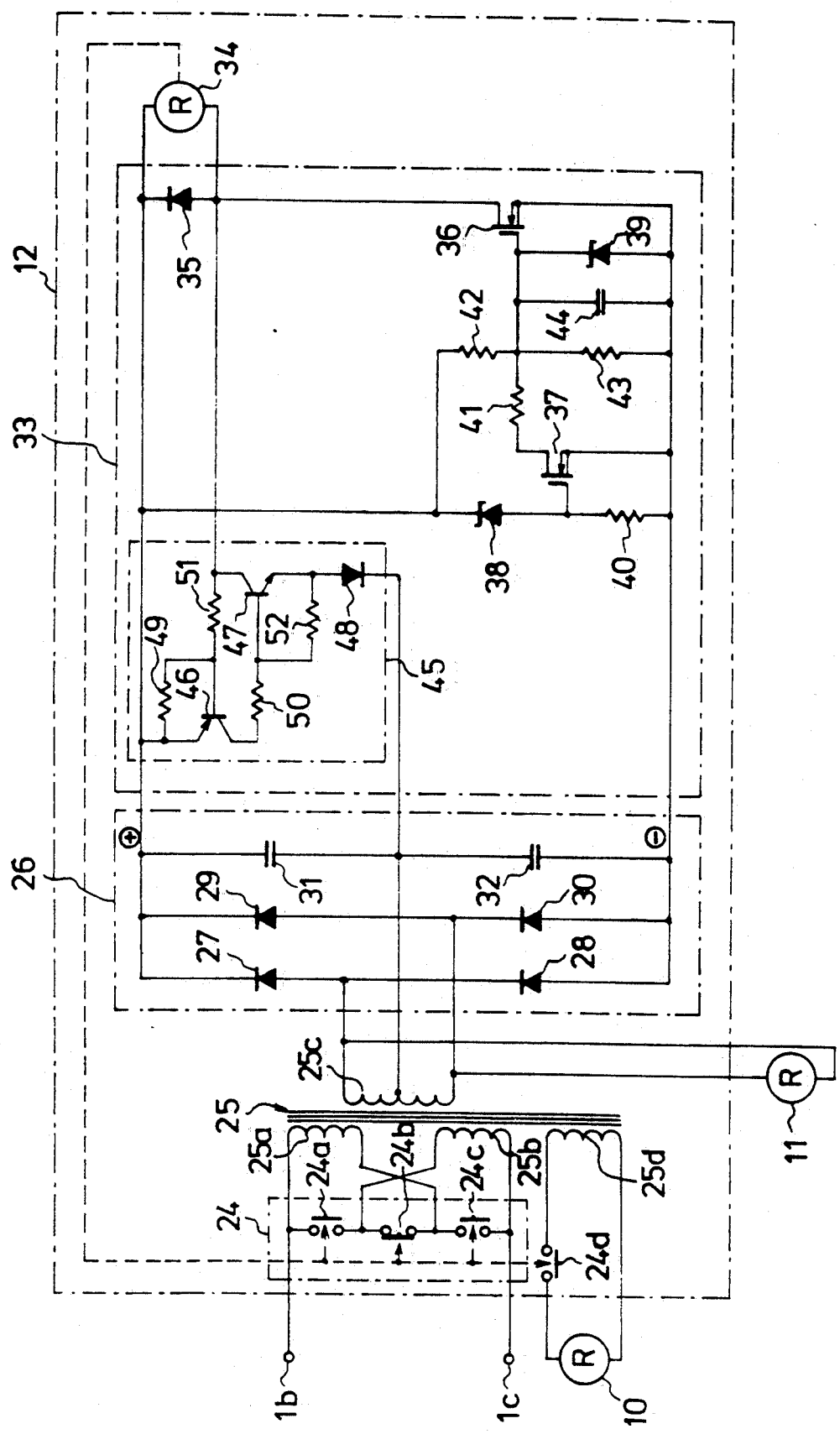
FIG. 2 is a diagram showing detailed configuration of part of the circuit of FIG. 1.

Referring next to FIG. 2 showing the relay driving circuit 12 of FIG. 1, the circuit 12 includes a control switch unit 24 composed of a series connection of a normally-open switch 24a, a normally-closed switch 24b and a normally-open switch 24c and connected between two input terminals 1b and 1c of the three-phase power supply. A first primary winding 25a of a control power transformer 25 is connected between the input terminals 1b and a junction of the switches 24b and 24c and a second primary winding 25b thereof is connected between a junction of the switches 24a and 24b and the input terminal 1c. The transformer 25 includes a center-tapped secondary winding 25c and the aforementioned timer relay 11 is connected between both ends thereof. The transformer 25 further includes a tertiary winding 25d and the aforementioned main relay 10 is connected between both ends thereof through a normally-open switch 24d.

The relay driving circuit 12 further includes a d.c. convertor 26 enclosed with a phantom block and composed of a parallel connection of a diode bridge circuit of four diodes 27, 28, 29 and 30 and a series circuit of two capacitors 31 and 32. The secondary winding 25c of the transformer 25 is connected between a junction of the diodes 27 and 28 and a junction of the diodes 29 and 30 and a junction of the capacitors 31 and 32 is connected to the center of the secondary winding 25c.

The relay driving circuit 12 also includes a relay control circuit 33 enclosed with another phantom block and a control relay 34 driven by the circuit 33 to concurrently turn the above-mentioned switches 24a, 24b, 24c and 24d. The control circuit 33 includes a surge absorbing diode 35 connected in parallel to the control relay 34, relay controlling field-effect transistors (hereinunder referred to as "FET") 36 and 37. Zener diodes 38 and 39, resistors 40, 41, 42 and 43, capacitor 44 and latch circuit 45. The latch circuit 45 includes trans 46 and 47, a diode 48 and resistors 49, 50 and 51 and 52. The FET 36 has its conduction path connected in series with the diode 35 between both input terminals of the d.c. convertor 26 and its gate connected through the resistor 41 and a conduction path of the FET 37 to the negative output terminal of the d.c. convertor 26. The FET 37 has its gate connected through the Zener diode 38 to the positive output terminal of the d.c. convertor 26 and also connected through the resistor 40 to the negative output terminal thereof. The gate of the FET 36 is further connected through the resistor 42 to the positive output terminal of the d.c. convertor 26 and also connected through a parallel charging and discharging circuit of the Zener diode 39, resistor 43 and capacitor 44 to the negative output terminal thereof. In the latch circuit 45, the transistor 46 has its emitter connected to the positive output terminal of the d.c. convertor 26, its collector connected through the resistor 50 to the base of the transistor 47 and its base connected through the resistor 51 to the collector of the transistor 47 and a junction of the diode 35 and FET 36. The transistor 47 has its emitter connected through the diode 48 to the center tap of the secondary winding 25c of the transformer 25. The resistors 49 and 52 are connected between the bases and emitters of the transistors 46 and 47, respectively.

Then, an operation of the embodiment will be described below. In the initial condition where no power supply is connected to the input terminals 1a, 1b and 1c, no voltage is generated across the secondary winding 25c of the control power transformer 25, so that the timer relay 11 does not operate and the above-mentioned switches 5 and 8 are left open. Also, the control relay 34 does not operate, so that the above-mentioned switches 24a, 24c and 24d are left open and the switch 24b is left closed. Therefore, main relay 10 does not operate, so that the above-mentioned main switches 3a and 3c are left open and the switch 3b is left closed. Accordingly, in this condition, the first and second smoothing capacitors 6 and 9 are connected in series between both terminals of the three-phase input rectifier 2 and the primary windings 25a and 25b of the transformer 25 are connected in series between the power input terminals 1b and 1c.

When a high voltage three-phase a.c. power having an effective value of 400 volts is applied to the input terminals 1a, 1b and 1c, this power is rectified by the input rectifier 2 and the rectified output is applied across the series connection of the smoothing capacitors 6 and 9 to preliminarily charge them. If the resistors 4 and 7 are disregarded at this time, the voltage applied to each of the capacitor 6 and 9 is about a half of the output voltage of the rectifier 2. On the other hand, a two-phase interphase voltage of 400 volts between the input terminals 1b and 1c is applied across the series connection of the primary windings 25a and 25b of the transformer 25. If the number of total turns of both primary windings is, for example, four times the number of turns of the secondary winding 25c at this time, an a.c. voltage of 100 volts will be induced across the secondary winding 25c. This a.c. output voltage is rectified and smoothed by the d.c. convertor 26 and a d.c. voltage of about $\sqrt{2}$ times 100 volts is generated between both terminals of the convertor 26. If the Zener voltage of the Zener diode 38 and the value of the resistor 40 are previously selected so that the Zener diode 38 is driven into conduction by this voltage, the Zener diode 38 will come into conduction and make the FET 37 conductive. With this conduction, the FET 36 is obstructed with increase in its gate voltage and does not conduct and, therefore, the control relay 34 does not operate. Accordingly, the control switches 24a, 24b, 24c and 24d are kept in the above-mentioned initial condition and the main relay 10 does not operate also. Consequently, the main switch unit 3 is also kept in the initial condition and the smoothing capacitors 6 and 9 are kept in series between both output terminals of the input rectifier 2.

On the other hand, with the output of the secondary winding 25c of the transformer 25, the timer relay 11 commences its operation and, after a relatively short preset discriminating and switching time, it closes the switches 5 and 8 to shorten the resistors 4 and 7. Thus, the series connection of the smoothing capacitors 6 and 9 is directly connected between both output terminals of the rectifier 2 and each capacitor is charged up to a voltage of about $\sqrt{2}$ times 200 volts. The invertors 14 and 16 are normally operated with this d.c. voltage as their rated voltage. When the power supply is shut off, the timer relay 11 stops its operation and returns the switches to their initial condition.

In contrast, when a low voltage a.c. power of 200 volts is applied to the input terminals 1a, 1b and 1c, the output voltage of the input rectifier 2 drops to about a half of that at the time of above-mentioned high voltage application and this low voltage output is applied at first to the series connection of the smoothing capacitors 6 and 9. The secondary voltage of the power transformer 25 also drops to about a half, that is, about 50 volts and the output voltage of the d.c. convertor 26 is also halved. Therefore, the Zener diode 38 does not conduct and the FET 37 does not conduct, too. Accordingly, the FET 36 conducts with increase of its gate voltage and energizes the control relay 34. At this time, the control relay 34 is applied with the rectified secondary voltage of the transformer of about $\sqrt{2}$ times 50 volts. With conduction of the FET 36, the transistors 46 and 47 of the latch circuit 45 are successively driven into conduction and this state is latched. The control relay 34 turns the respective switches in the control switch unit 24 to a direction opposite to the initial condition and closes the switch 24d to energize the main relay 10. Thus, the main relay unit 3 is also turned similarly.

Accordingly, the smoothing capacitors 6 and 9 are respectively connected in parallel between both output terminals 2p and 2n of the input rectifier 2 and the primary windings 25a and 25b of the power transformer 25 are also connected in parallel between both input terminals 1b and 1c. Therefore, the number of turns of the primary winding of the transformer 25 is halved and the secondary voltage thereof is doubled into 100 volts. Thus, the Zener diode 38 is driven into conduction to shut off the FET 36, as described above, while the control relay 34 is still applied with a half of the output voltage of the d.c. convertor 26, that is, a voltage of about 2 times 50 volts as same as in the above-mentioned case, through the transistor 47 and diode 48 of the latch circuit 45 and kept energized. The above-mentioned preset time after the main relay 10 is energized, the timer relay 11 operated to close the switches 5 and 8 and the output of the rectifier 2 is directly applied across the parallel connection of the smoothing capacitors 6 and 9. Thus, each capacitor is charged up to a voltage of about $\sqrt{2}$ times 200 volts as in the case of high voltage power supply and each of invertors 14 and 16 operates normally with its rated input voltage. When the power supply is shut off, the timer relay 11 and control relay 34 stop their operation and return all switches to their initial condition.

It should be understood from the above description that the invertors 14 and 16 operate with the same input voltage even if the power supply voltage is halved or doubled and this fact is regardless of the number of turns the power transformer 25. Although the description has been made on the case where both primary windings 25a and 25b of the transformer 25 are equal in the number of turns, there should be no trouble in the case where the differ, if the values of the control elements are selected adequately. Anyhow, both invertors 14 and 16 are driven in synchronism with each other as well know in the art by the driving circuit 19 to induce high frequency a.c. powers of the same phase in the primary windings 17a and 18a of the output transformers 17 and 18, respectively, in the same winding direction. Since the first secondary windings 17b and 18b and the second secondary windings 17c and 18c of both transformers 17 and 18 are respectively connected in series in the same winding direction, as aforementioned, both transformers 17 and 18 co-operate with the rectifying diodes 20 and 21 to constitute a single transformer-rectifier having current balancing function, thereby providing a desired arc-welding d.c. power of suitable reduced voltage at the d.c. output terminals 23p and 23n.

Since the input voltages of the invertors 14 and 16 are near the voltage of the low voltage power supply as described above, they are much lower than that in the device of the aforementioned Japanese utility model opening No. H1-151975 and, therefore, the switching elements of the invertors, such as transistors 14c, 14d, 16c and 16d can be reduced in breakdown voltage and raised in switching frequency. Accordingly, it is possible to make radiator components of the transistors 14c, 14d, 16c and 16d and, then, the transistors themselves small in size to make the invertors small and, also, to make the output transformer small, thereby making the whole device small in size and weight.

The above embodiment has been given for the illustrative purpose only and does not mean any limitation of the invention. It should be obvious to those skilled in the art that various modifications and changes can be added to this embodiment within the spirit and scope of this invention as defined in the appended claims. For example, the a.c. power supply may be of single phase or multi-phase other than three-phase and the two kinds of voltage thereof may be optional so long as their ratio is about one to two. While the Zener diode 38 is used as means for discriminating the two kinds of voltage, it is possible to use any other suitable means. It is a matter of course that the above-mentioned switching elements such as transistors and FETs can be selected arbitrarily from various electronic elements including thyristers and likes.

We claim:

1. An arc welder comprising input terminals to which an a.c. power supply of either high voltage or low voltage which is substantially a half of said high voltage is to be connected, an input rectifier for rectifying an input from said a.c. power supply, a pair of capacitors for smoothing an output of said input rectifier, a pair of invertors driven by outputs of said capacitors respectively to generate corresponding high frequency a.c. power outputs, an output transformer including a pair of primary windings provided with said high frequency a.c. outputs of said pair of invertors respectively for transforming said high frequency outputs, an output rectifier for rectifying an output of said transformer, and switching means for discriminating voltages of said a.c. power supply connected to said input terminals and connecting said pair of capacitors in series and parallel between output terminals of said input rectifier in response to said high and low voltages, respectively;
characterized in that said switching means includes another transformer having another pair of primary windings connected to said input terminals and a secondary winding provided with a center tap; means for discriminating voltages across said secondary winding and providing a discrimination signal in response thereto; relay means, responsive to said discrimination signal, for switching connections of said capacitors and connecting said other pair of primary windings in series or parallel between said input terminals; and latching means, responsive to a low voltage across said secondary winding, for applying a voltage of said center tap to said relay means and holding said relay in an energized state even when voltage across said secondary winding rises.

2. An arc welder as set forth in claim 1, characterized in that said voltage discriminating means includes a Zener diode.

3. An arc welder comprising input terminals to which an a.c. power supply of either high voltage or low voltage which is substantially a half of said high voltage is to be connected, an input rectifier for rectifying an input from said a.c. power supply, a pair of capacitors for smoothing an output of said input rectifier, a pair of invertors driven by outputs of said capacitors respectively to generate corresponding high frequency a.c. power outputs, an output transformer including a pair of primary windings provided with said high frequency a.c. outputs of said pair of invertors respectively for transforming said high frequency outputs, an output rectifier for rectifying an output of said transformer, and switching means for discriminating voltages of said a.c. power supply connected to said input terminals and connecting said pair of capacitors in series and parallel between output terminals of said input rectifier in response to said high and low voltages, respectively, characterized in that said output transformer comprises:
two pairs of secondary windings, each pair of which co-operates with each said primary winding, and one and the other secondary windings of one of said pairs are respectively connected in series with one and the other secondary windings of the other of said pairs in a same winding direction to form current balancers.

4. An arc welder comprising input terminals to which an a.c. power supply of either high voltages or low voltage which is substantially a half of said high voltage is to be connected, an input rectifier for rectifying an input from said a.c. power supply, a pair of capacitors for smoothing an output of said input rectifier, a pair of invertors driven by outputs of said capacitors respectively to generate corresponding high frequency a.c. power outputs, an output transformer including a pair of primary windings provided with said high frequency a.c. outputs of said pair of invertors respectively for transforming said high frequency outputs, an output rectifier for rectifying an output of said transformer, and switching means for discriminating voltages of said a.c. power supply connected to said input terminals and connecting said pair of capacitors in series and parallel between output terminals of said input rectifier in response to said high and low voltages, respectively, characterized in that said output transformer comprises;
a pair of tertiary windings co-operating with said pair of primary windings, and said welder further comprises a pair of feedback rectifiers for rectifying outputs of said tertiary windings, respectively, an output of each of said feedback rectifiers being applied to a corresponding one of said invertors to form a current balancer.

* * * * *